UNITED STATES PATENT OFFICE.

HERMAN FLECK AND WILLIAM GEORGE HALDANE, OF GOLDEN, AND EDWIN LYMAN WHITE, OF DENVER, COLORADO.

PROCESS OF EXTRACTING URANIUM AND VANADIUM FROM ORES.

No. 890,584.     Specification of Letters Patent.     Patented June 9, 1908.

Original application filed June 18, 1907, Serial No. 379,658. Divided and this application filed September 30, 1907, Serial No. 395,310.

*To all whom it may concern:*

Be it known that we, HERMAN FLECK and WILLIAM G. HALDANE, residing at Golden, Jefferson county, Colorado, and EDWIN L. WHITE, residing at Denver, Denver county, Colorado, have invented certain new and useful Improvements in Processes of Extracting Uranium and Vanadium from Ores, of which the following is a specification.

The object of this invention is to provide a method of extracting uranium, vanadium and other values from ores containing the same while fully utilizing the acid solvent employed; the method is applicable to a variety of ores containing uranium or vanadium, but will be described by reference to the treatment of carnotite, or ores containing carnotite as a constituent mineral. This mineral often occurs as an impregnation or incrustation in the sand stones or shales of western Colorado and Utah, usually yellow or light brown in color but sometimes colored blue or green by carbonates of copper.

We may proceed substantially as follows: The ore is crushed, preferably to 20–40 mesh, by any suitable means, and is then agitated with hot sulfuric acid of 15–20 percent. concentration, the proportion of acid used depending upon the quality of the ore; as a rule four hundred pounds of sulfuric acid of 65° Baumé, diluted to 15–20 percent., will be found sufficient for the treatment of one ton of ore. The resulting acid solution contains the uranium, vanadium and copper values, and is preferably filtered or otherwise clarified. The resulting clear acid solution is then brought into contact with fresh ore, being preferably heated and agitated in contact therewith, whereby the solution is neutralized; at the same time a part of the uranium, vanadium and other values, frequently accompanied by iron, is precipitated upon the ores as basic sulfates or carbonates, the effect of this precipitation being to enrich the ore which may be initially of a low grade. The neutral solution is again clarified if necessary and constitutes a portion of the stock solution suitable for further treatment for the separation of the values as hereinafter described. The enriched ore which has served for the neutralization of the acid solution, either alone or mixed with fresh ore, is treated with sulfuric acid as above described, yielding an acid solution which after neutralization as above is added to the stock solution. The ore residues from the treatment with sulfuric acid, as well as the residues from the similar treatment of the enriched ore, are freed from remaining values by washing with dilute sulfuric acid or acidulated water; the resulting acid washings are then strengthened by the addition of sulfuric acid to a preferred concentration of 15–20 percent., and are utilized for the continuance of the process.

The substantially neutral stock solution containing uranium, vanadium and usually copper and iron is then treated with sulfurous acid, usually by subjecting the solution to the action of sulfur dioxid obtained by roasting sulfur or sulfid ores. This effects the reduction of the iron and vanadium compounds present to the ferrous and vanadous states respectively, a corresponding quantity of sulfur dioxid being simultaneously oxidized to sulfur trioxid and combining with the water of the solution to form sulfuric acid. In thus reducing the iron to the ferrous condition the advantage is secured that in the subsequent precipitation of the uranium and vanadium less iron is precipitated and the values are therefore obtained in more concentrated form. A further important advantage is that the sulfuric acid derived from the sulfur dioxid is available for the treatment of additional quantities of ore, and may be utilized by adding to the acid solution a quantity of ore just sufficient to neutralize the same while avoiding the precipitation of any values; the residue from the ore employed for neutralization is utilized in the initial state of the process.

The reduced and substantially neutral solution is separated from the ore, clarified if necessary by filtration or decantation, and treated with the calculated quantity of finely pulverized limestone or equivalent carbonate to bring it to the point where uranium, vanadium and copper values would just begin to separate, calcium sulfate being formed. The solution is now separated from the calcium sulfate, and the values completely precipitated by boiling with the requisite quantity of pulverized limestone. The precipitate, which comprises a complex mixture containing basic sulfates and carbonates of uranium and vanadium, compounds of iron, and hydrated calcium sulfate, is initially green but changes rapidly in air to light green or yellow. It may be profitably shipped, preferably after drying, or drying and igniting to effect a further concentration of the values. Or the values may be further refined or concentrated by any known or suitable method. For instance they may be treated wet or dry with sulfurous acid solution, which takes up the values forming a greenish solution of sulfites; this solution when boiled evolves sulfur dioxid, which may be recovered and again utilized, and precipitates uranium basic sulfite, which may be ignited to uranium oxid. The vanadium remains in solution and may be precipitated, together with some iron, by caustic lime.

Sulfurous acid may be used on some ores for the direct extraction of the values without previous treatment with sulfuric acid; this may be accomplished by passing sulfur dioxid into water covering the ore, the entire mass being heated and agitated, preferably under pressure. The values pass into solution which is drawn off and if necessary filter-pressed or otherwise clarified. Upon boiling the clear liquor, sulfur dioxid is recovered, and the uranium is precipitated as basic sulfite and subsequently ignited to uranium oxid. The vanadium remains in solution and may be recovered by precipitation by caustic lime as above described.

It will be observed that the method as above described involves the complete utilization of the sulfuric acid employed as a solvent, as well as of the acid formed in solution with the concurrent reduction of the compounds of iron and vanadium, and that it is therefore very economical as regards consumption of acid. The precipitation and refining of the values are accomplished by the use of inexpensive reagents, and the method as a whole is both economical and efficient.

This application is a division of a prior application filed June 18th, 1907, Serial No. 379,658.

We claim:

1. The method of treating ores containing uranium which consists in subjecting the ore to a solution of sulfurous acid to extract uranium and heating the resulting solution, thereby expelling sulfur dioxid and precipitating uranium as basic sulfite.

2. The method of treating ores containing uranium which consists in subjecting the ore to a solution of sulfurous acid to extract uranium, heating the resulting solution to expel sulfur dioxid and precipitate uranium as basic sulfite, igniting the precipitate, and recovering sulfur dioxid.

3. The method of treating ores containing uranium and vanadium which consists in subjecting the ore to a solution of sulfurous acid to extract uranium and vanadium, heating the resulting solution to expel sulfur dioxid and precipitate uranium as basic sulfite, and precipitating vanadium from the residual solution by caustic lime.

4. The method of treating ores containing uranium or vanadium which consists in subjecting the ore to a solution of sulfurous acid under pressure to extract the values, and recovering the values from the resulting solution.

In testimony whereof we have fixed our signatures in the presence of two witnesses.

HERMAN FLECK.
WILLIAM GEORGE HALDANE.
EDWIN LYMAN WHITE.

Witnesses:
JAS. McKILLOP,
VIRGINIA PADEN.